US007783808B2

(12) United States Patent
Hall et al.

(10) Patent No.: US 7,783,808 B2
(45) Date of Patent: Aug. 24, 2010

(54) EMBEDDED SELF-CHECKING ASYNCHRONOUS PIPELINED ENFORCEMENT (ESCAPE)

(75) Inventors: Brendan Hall, Eden Prairie, MN (US); Kevin R. Driscoll, Maple Grove, MN (US); Michael Paulitsch, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 316 days.

(21) Appl. No.: 11/935,360

(22) Filed: Nov. 5, 2007

(65) Prior Publication Data

US 2008/0107029 A1    May 8, 2008

Related U.S. Application Data

(60) Provisional application No. 60/864,926, filed on Nov. 8, 2006.

(51) Int. Cl.
*G06F 13/18* (2006.01)
(52) U.S. Cl. ........................................ 710/241; 710/316
(58) Field of Classification Search ......... 710/240–244, 710/315–316
See application file for complete search history.

(56) References Cited

U.S. PATENT DOCUMENTS

| 4,701,756 | A | * | 10/1987 | Burr ...................... 340/825.02 |
| 4,982,400 | A | * | 1/1991 | Ebersole ..................... 370/407 |
| 5,041,963 | A | * | 8/1991 | Ebersole et al. ............. 370/407 |
| 5,053,942 | A | * | 10/1991 | Srini ........................... 710/317 |
| 5,179,669 | A | * | 1/1993 | Peters ........................ 710/317 |
| 5,218,676 | A | * | 6/1993 | Ben-Ayed et al. ........... 709/240 |
| 5,603,005 | A | * | 2/1997 | Bauman et al. ............. 711/124 |
| 5,754,543 | A | * | 5/1998 | Seid ........................... 370/351 |
| 5,936,962 | A | * | 8/1999 | Haddock et al. ............. 370/446 |
| 6,091,709 | A | * | 7/2000 | Harrison et al. ............. 370/235 |
| 6,101,565 | A | * | 8/2000 | Nishtala et al. ............. 710/307 |
| 6,181,708 | B1 | * | 1/2001 | Quackenbush et al. ...... 370/445 |
| 6,219,353 | B1 | * | 4/2001 | Wight et al. ................. 370/425 |
| 6,522,435 | B1 | * | 2/2003 | Chang et al. .................. 398/49 |

(Continued)

FOREIGN PATENT DOCUMENTS

JP    2003348140 A  *  12/2003

OTHER PUBLICATIONS

Almeida, "Safety-Critical Automotive Systems: New Decelopments in Can, Artist2 Imbedded Systems Design", 2006, pp. 1-23, Publisher: Information Society Technologies.

(Continued)

*Primary Examiner*—Paul R Myers
(74) *Attorney, Agent, or Firm*—Fogg & Powers LLC

(57) ABSTRACT

A network comprises a plurality of nodes; a plurality of bi-directional point-to-point communication links, wherein a priority-based arbitration scheme is used to communicate over each of the plurality of point-to-point links; and a hub that is communicatively coupled to each of the plurality of nodes via the plurality of point-to-point links; wherein when the hub determines that one or more of the nodes is transmitting a message via the hub, the hub selects which node's message should be forwarded to the other nodes based, at least in part, on the priority-based arbitration scheme and forwards the selected node's message to the other nodes with elevated priority.

25 Claims, 7 Drawing Sheets

U.S. PATENT DOCUMENTS

| | | | | |
|---|---|---|---|---|
| 6,765,905 | B2* | 7/2004 | Gross et al. | 370/389 |
| 6,782,428 | B1* | 8/2004 | Gleeson et al. | 709/233 |
| 6,961,793 | B2* | 11/2005 | Kato | 710/113 |
| 7,020,131 | B1* | 3/2006 | Yun et al. | 370/355 |
| 7,035,243 | B2* | 4/2006 | Shpak | 370/338 |
| 7,051,150 | B2* | 5/2006 | Naumann et al. | 710/317 |
| 7,058,751 | B2* | 6/2006 | Kawarai et al. | 710/317 |
| 7,239,669 | B2* | 7/2007 | Cummings et al. | 375/295 |
| 7,584,319 | B1* | 9/2009 | Liao et al. | 710/317 |
| 2002/0141427 | A1* | 10/2002 | McAlpine | 370/413 |
| 2005/0271076 | A1* | 12/2005 | Ganti et al. | 370/448 |

OTHER PUBLICATIONS

Bosch, "Can Specification Version 2.0, Parts A and B", "SAE Handbook—Parts and Components", 1998, pp. 1-72, vol. 2, Publisher: Society of Automotive Engineers.

Cristian, "Synchronous and Asynchronous", "Communications of the ACM", 1996, pp. 88-97, vol. 39, No. 4, Publisher: ACM.

Fischer et al., "Impossibility of Distributed Consensus With One Faulty Process", "Journal of ACM", Apr. 1985, pp. 374-382, vol. 32, No. 2, Publisher: ACM.

Lamport et al., "The Byzantine Generals Problem", "ACM Toplas", 1982, pp. 382-401, vol. 4, No. 3, Publisher: ACM.

Latronico et al., "Investigating the Reliability of the TTP/C Membership Service Assumptions", 2004, pp. 121, Publisher: ECE Department, Carnegie Mellon University.

Pfeifer, "Formal Analysis Fo Fault-Tolerant Algorithms in the Time-Triggered Architecture; PhD Thesis", 2003, pp. 1-213, Publisher: University of Ulm.

Powell, "Group Communication", "Communications of the ACM", 1996, pp. 50-53, vol. 39, No. 4, Publisher: ACM.

"Time-Triggered Protocol TTP/C. High-Level Specification Document.", Jul. 2002, pp. 1-131, Publisher: TTTECH COMPUTERTECHNIK GmbH.

* cited by examiner

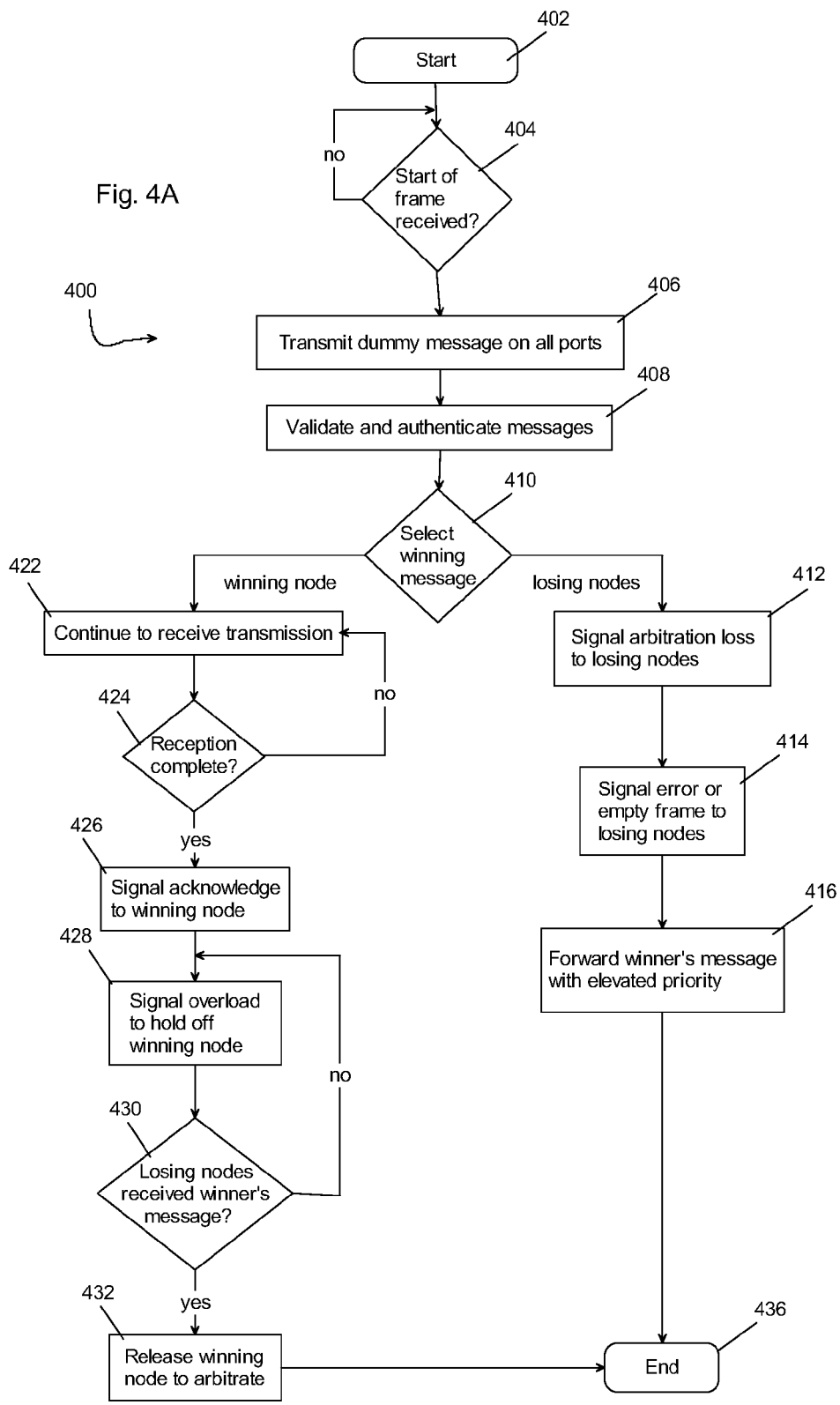

EMBEDDED SELF-CHECKING ASYNCHRONOUS PIPELINED ENFORCEMENT (ESCAPE)

CROSS REFERENCE TO RELATED APPLICATIONS

This application is related to co-pending U.S. patent application Ser. No. 11/557,886, filed Nov. 9, 2006 entitled "METHOD FOR ACKNOWLEDGEMENT OF MESSAGES IN A STAR NETWORK", hereby incorporated herein by reference, and referred to herein as the "'525 application".

This application is related to co-pending U.S. provisional patent application Ser. No. 60/864,926, filed Nov. 8, 2006 entitled "PIPELINED ELEVATED PRIORITY CENTRALIZED ENFORCEMENT (PEPCE) FOR A CONTROLLER AREA NETWORK", hereby incorporated herein by reference, and referred to herein as the "'057 application". The present application hereby claims priority, under 35 U.S.C. § 119(e), to U.S. Provisional Patent Application No. 60/864,926.

BACKGROUND

The Controller Area Network (CAN) protocol (ISO 11898) is flexible and easy to deploy in distributed embedded systems. It has been widely used in various industries. For example, the CAN protocol is a de facto network standard for automotive applications. Since initial deployments in the late 1980s the simple low-cost bus topology and inherent flexibility of CAN have enabled it to capture the majority of low- to medium-speed networking traffic. Today most automotive engine control units (ECU) have some form of connection to a CAN network, and most automotive-centric semiconductors have at least one integrated CAN controller.

Integrity and availability are two attributes of dependable communication systems. Availability is the "readiness for correct service." Integrity is the "absence of improper system state alterations." Conventional solutions are concerned about medium availability—stemming e.g. from babbling devices, shorted, or broken media (partitioning of physical media)—and persistent message integrity errors stemming from bit flips and stuck-at-node faults.

However, node-induced addressing faults due to faulty hardware or software resulting in masquerading faults have not been considered in detail by the conventional approaches. For example, some conventional approaches only protect the physical layer and will not cover faulty software or chips or memory affected by bit flips. Masquerading faults are particularly important for protocols that are influenced by software, since any software failure can result in persistent masquerade errors and incorrect accusation of the nodes, i.e. the wrong not is assumed to be faulty. Since these failures result in messages that are syntactically well-formed, they are especially hard to detect by diagnosis equipment monitoring a shared medium such as a bus using conventional approaches. As more safety-relevant applications emerge, the importance of covering both physical and software failure, such as masquerade faults, will increase due to the development of software-based architecture approaches.

SUMMARY

In one embodiment a network is provided. The network comprises a plurality of nodes; a plurality of bi-directional point-to-point communication links, wherein a priority-based arbitration scheme is used to communicate over each of the plurality of point-to-point links; and a hub that is communicatively coupled to each of the plurality of nodes via the plurality of point-to-point links; wherein when the hub determines that one or more of the nodes is transmitting a message via the hub, the hub selects which node's message should be forwarded to the other nodes based, at least in part, on the priority-based arbitration scheme and forwards the selected node's message to the other nodes with elevated priority.

DRAWINGS

DETAILED DESCRIPTION

Figure 1A:
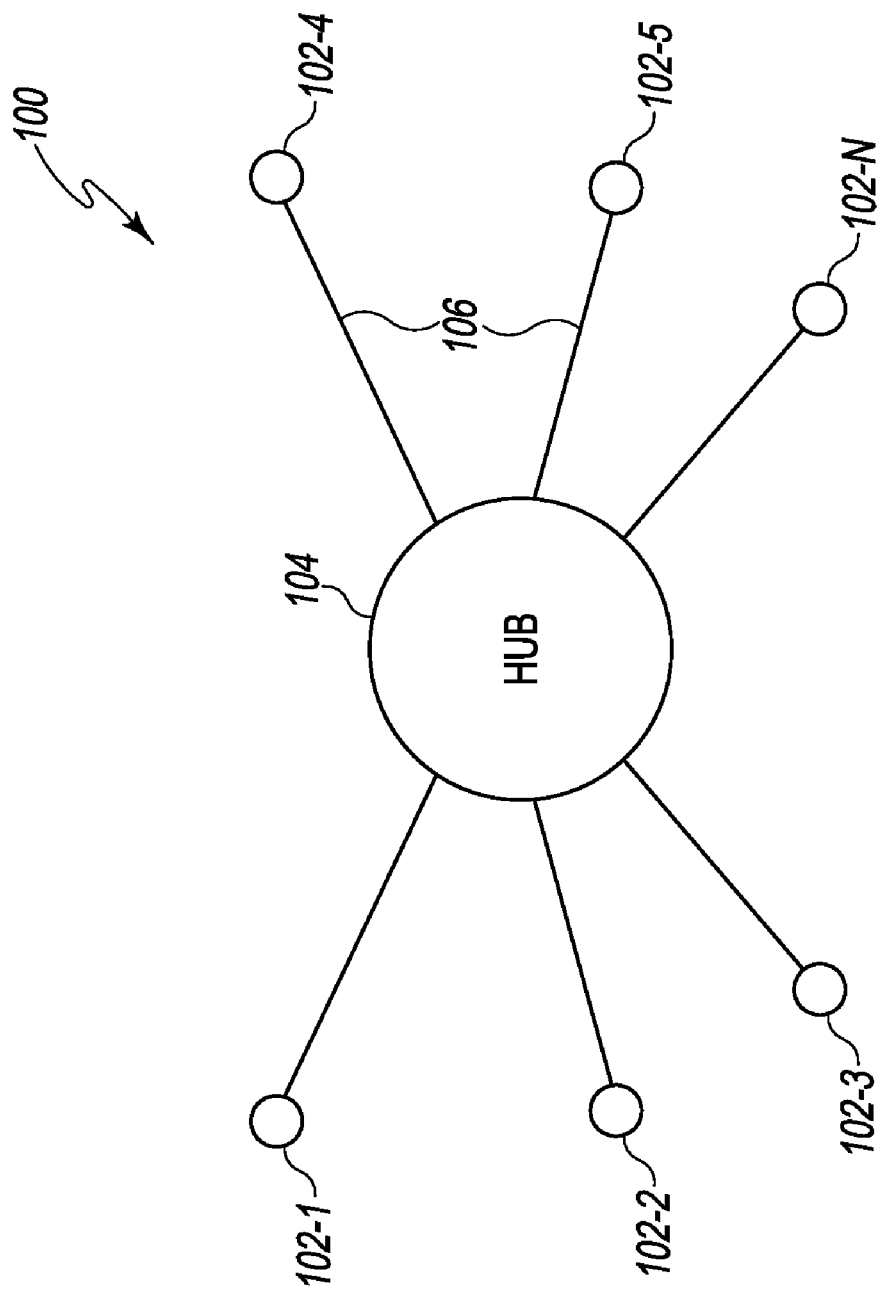
FIG. 1A is a schematic depiction of one embodiment of a network.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary methods illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

FIG. 1A is a schematic depiction of one embodiment of a network 100. Network 100 uses carrier sense multiple access/collision detect (CSMA/CD) with non-destructive bitwise bus arbitration to determine the priority of messages and resolve collisions. In particular, system 100 uses the Controller Area Network (CAN) protocol. It is to be understood that, although the figures are described in relation to the CAN protocol, other protocols can be used in other embodiments.

In network 100, nodes 102-1 . . . 102-N are each directly connected to a hub 104 via one of communication links 106 in a star configuration. Communication links 106 are bi-directional half-duplex point-to-point links. The point-to-point isolation of the star topology provides the required resilience to spatial proximity faults, e.g. physical media damage. Hub 104 also enables additional network policies and software fault containment to be enforced by centralized guardian action. As used herein, the term "hub" refers to a central unit coupled to each of a plurality of distributed nodes via a point-to-point communication link for each node. Similarly, the term "node" refers to an electronic device configured to perform one or more functions in a network. For example, in an automotive network, a node can include, but is not limited to, anti-lock brakes, power steering, air conditioning, power windows, engine management system, etc.

In a typical CAN system, a logical "1" is a recessive bit and a logical "0" is a dominant bit. The priority of a message, in this embodiment, is indicated by the numerical value of its message ID (also referred to as MSG ID or the priority field) which is a function of the software used. Hence, the message ID with the lowest numerical value has the highest priority and wins arbitration. However, in other embodiments, other priority schemes are used. For example, in one other embodiment, a separate priority field is used rather than the MSG ID to indicate priority. In addition, in a typical CAN network, a recessive bit can be overwritten by a dominant bit, but not vice versa. The state of each link 106, therefore, is only recessive if both hub 104 and the respective node for each link 106 transmit a recessive bit. If either transmits a dominant bit, the dominant bit overwrites a recessive bit transmitted by the other (that is, a dominant state for the given link 106). Each of nodes 102-1 . . . 102-N monitors the link state of its associated link 106 as each node transmits.

If a node determines that it has lost arbitration during an arbitration period, the losing node ceases transmission and begins receiving the winning node's message. In this way collisions are avoided on links 106. The bit arbitration behavior of the CAN protocol is a fault-propagation path for addressing, also called MSG ID errors or masquerading. In a typical CAN network, any incorrect dominant bit transmitted from a faulty node early in the message identifier can influence the behavior of all non-faulty nodes due to the arbitration back-off as discussed above. Since the protocol mandates the incremental dominant/recessive arbitration of each MSG ID bit, a typical CAN network can not contain a faulty bit until it has already influenced the arbitration action.

However, in embodiments of the present invention, each of nodes 102-1 . . . 102-N is linked to hub 104 via an independent link 106. In some embodiments, at least one of links 106, which individually couple nodes 102-1 . . . 102-N to hub 104, is implemented as an optical link. The state of each link 106 is determined by the bits transmitted by hub 104 and the respective node coupled to each link 106. Hence, embodiments of the present invention adopt a pipelined forwarding distribution which enables hub 104 to independently observe and validate the entire MSG ID from each arbitrating node without interference. Although, this pipelined forwarding activity is different from the behavior of a standard CAN bus, the underlying protocol is standard CAN, and all clients (nodes) that connect to hub 104 do so using standard CAN hardware and protocol in standard wiring configurations.

The qualified arbitration action of hub 104 is implemented by reserving certain bits and labels from the MSG ID. The most significant bit (MSB) of the MSG ID is reserved for qualified arbitrated messages forwarded by hub 104; the least significant bit (LSB) is used to signal the status of the fault-tolerant arbitration to the connected clients. In addition, MSG IDs that require bit stuffing action are also reserved and cannot be allocated to transmitting nodes. The lowest priority MSG ID is also reserved for use by hub 104. MSG IDs are allocated in accordance with network rules and each node 102-1 . . . 102-N is communicatively connected to hub 104. Hub 104 then uses the reserved bits and labels in performing enforcement actions. Details of the use of the reserved bits and labels by hub 104 are described below.

When one of nodes 102-1 . . . 102-N has a message to transmit, it simply waits for the required minimum bus idle time before commencing its transmission with the dominant Start of Frame (SOF) field. Following the SOF field, the node transmits the MSG ID, MSB first, to initiate the arbitration sequence. During the transmission of the MSG ID field, the node monitors the status of the transmit (TX) and receive (RX) lines of its corresponding link 106 to detect conflicts on the link. If the node is transmitting a recessive bit of the MSD ID but detects a dominant bit on the medium, it concludes that it has lost arbitration and ceases its transmission and switches to receive the higher priority message in accordance with standard arbitration logic as discussed above. If the node reaches the end of the arbitration field without detecting a conflict on the corresponding link 106, it concludes that it has won the arbitration and continues to send the remaining portion of the message under transmission. During the transmission of the remainder of the message, the winning node continues to monitor the TX and RX consistency; if a conflict is detected during the transmission of the message body, the node concludes that an error has occurred and an error flag is forced to signal this status to all nodes.

In typical CAN networks, bit stuffing is performed throughout the entire transmission. That is, when a node has transmitted a sequence of five identical bits, it inserts an opposing bit to ensure that the link layer retains sufficient edges to maintain suitable synchronization. However, in some embodiments of the present invention, the MSG IDs that require bit stuffing are not used; therefore, bit stuffing is only performed for payload and cyclic redundancy check (CRC) fields. Prevention of bit stuffing during the MSG ID only affects label assignment and, thus, software configuration tools and not the standard CAN hardware. Avoiding bit stuffing with the MSG ID field of nodes 102-1 . . . 102-N keeps all sending nodes time-aligned, (that is, at the same bit number) such that they will send the MSG ID at the same point in time. This situation allows hub 104 to take a consistent, system-wide arbitration action.

However, in some embodiments, bit stuffing in the MSG ID is not prevented. In such embodiments, other means are used to ensure that the MSG IDs are aligned. For example, in one embodiment, one or more bits at the end of the MSG ID are reserved as an extended arbitration signaling mechanism. The number of bits reserved at the end of the MSG ID is dependent on the number of bits used for bit stuffing. For example, if the MSG ID is 11 bits in length, the maximum number of bits which will be inserted for bit stuffing is two bits. This is because a bit is inserted after 5 consecutive bits of the same value.

Figure 2:
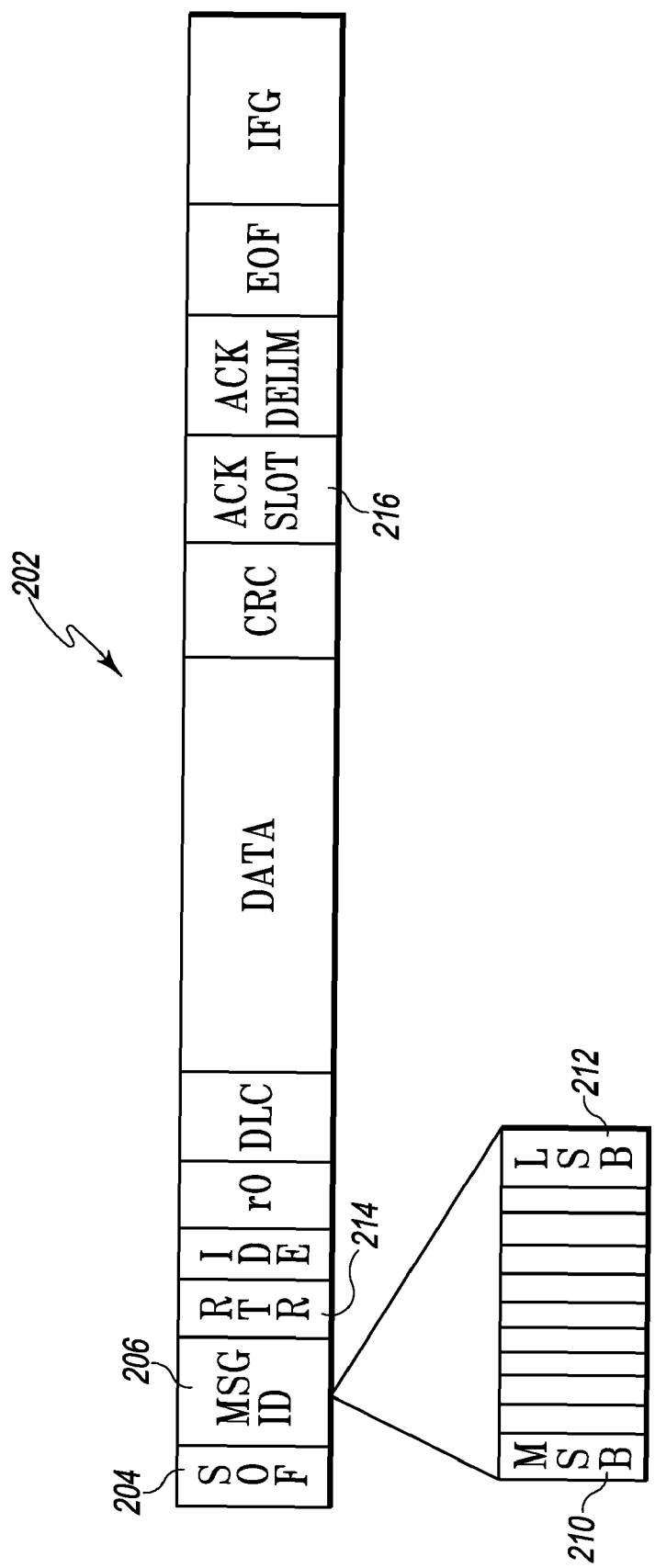
FIG. 2 depicts an exemplary data frame.
Figure 3:
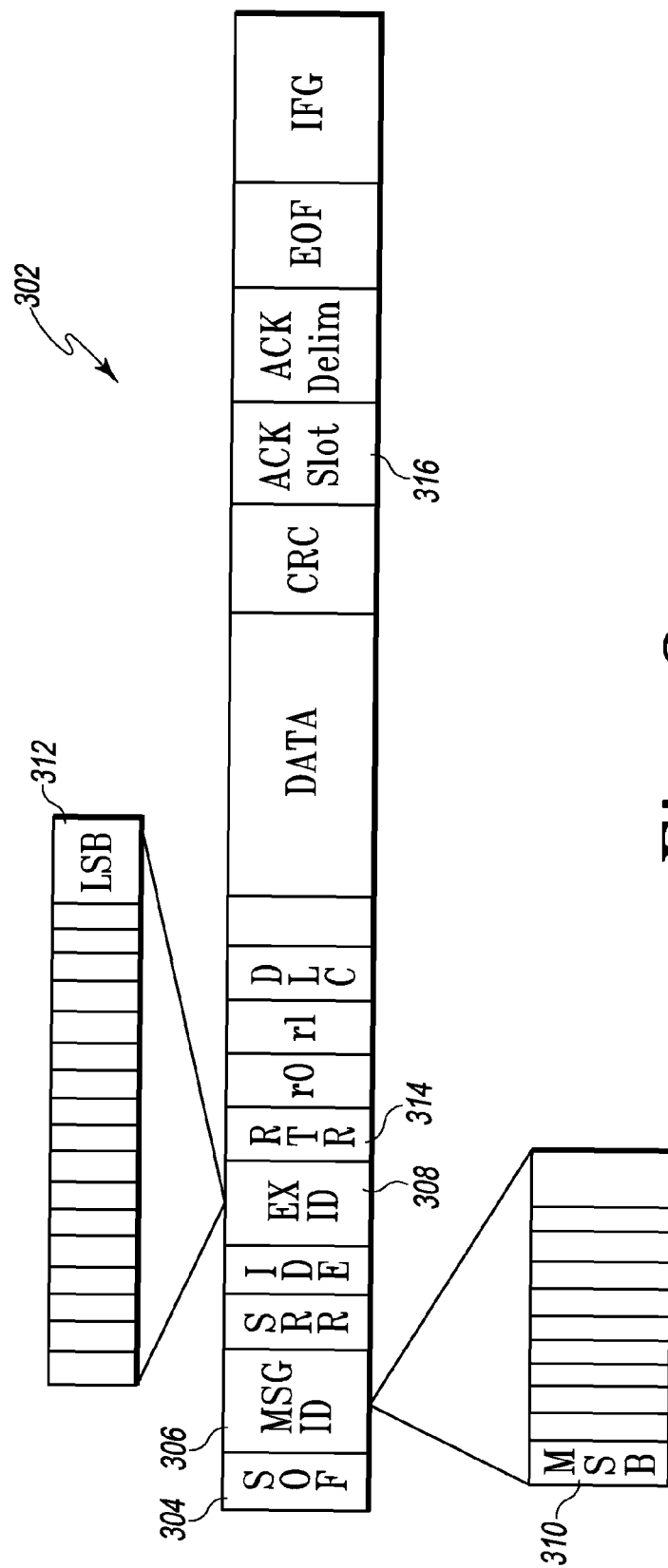
FIG. 3 depicts another exemplary data frame.

In addition, in this embodiment, each of nodes 102-1 . . . 102-N is configured to transmit all messages with a recessive bit in the most significant bit (MSB) and least significant bit (LSB) of the message ID. For example, exemplary message frame formats are shown in FIGS. 2 and 3. In the embodiment of FIG. 2, message ID field 206 of frame 202 contains 11 bits (as described in CAN Specification 2.0 part A). The 11 bit message ID field 206 is also referred to as the base identifier. In embodiments of the present invention, MSB 210 and LSB 212 in message ID field 206 are recessive bits in all messages sent from nodes 102-1 . . . 102-N. In contrast, an extended message ID is used in frame 302 in FIG. 3. In particular, the extended message ID contains 29 bits comprised of the 11-bit base identifier 306 and an additional 18-bit extension field 308 following an Identifier Extension (IDE) bit which indicates that an extended message ID is being used (as described in CAN Specification 2.0 part B). As with message ID field 206, MSB 310 and LSB 312 in message ID field 306 are recessive bits in all messages sent from nodes 102-1 . . . 102-N.

Furthermore, in some embodiments, network 100 is configured to use both 11-bit and 29-bit frames. In some such embodiments, additional bits are reserved. For example, the last bit ($11^{th}$ bit) of the base identifier 206 and 306 is also reserved for arbitration by hub 104. In order for hub 104 to transparently handle both 11- and 29-bit IDs, hub 104 is configured to identify the frame version (11- or 29-bits) before receiving the last bit ($11^{th}$ bit) of the base identifier 206 and 306. In some embodiments, the frame version is identified by reserving an additional bit (pseduo-IDE bit) between the MSB 210, 310 and the 11$^{th}$ bit of the base identifier 206, 306. The bit is used similar to the IDE bit in conventional CAN networks. In particular, in one such embodiment, all 29-bit messages are assigned a recessive pseduo-IDE bit while all 11-bit messages are assigned a dominant pseduo-IDE bit. In other embodiments, the pseduo-IDE bit is not used in hybrid networks (e.g. networks using both 11- and 29-bit messages). In some such embodiments, the MSG IDs of all 11-bit and 29-bit frames are assigned such that no 11-bit MSG ID has a lower priority than a 29-bit MSG ID. Thus, embodiments of the present invention enable hub 104 to identify the frame version of each MSG ID in a hybrid network.

When the hub 104 detects the Start of Frame (SOF) field on any of its inputs, it reflects the SOF to all of the connected ports. Following the SOF transmission, each of nodes 102-1 . . . 102-N, which desires to transmit a message (that is, each active arbitrating node), immediately transmits the MSB of its MSG ID field. As discussed above, in a typical CAN network, due to the wired AND behavior of the dominant recessive bus, the arbitrated result is for each bit to facilitate the arbitration processes. However, in embodiments of the present invention, the direct sharing of incremental arbitration status is prevented.

Instead of reflecting the arbitrated bit-by-bit status of the multiple arbitrating node inputs following the detection of the SOF states, hub 104 starts to transmit a dummy message. The priority level of the dummy message lower than the priority of each message being transmitted over links 106 by nodes 102-1 . . . 102-N. In particular, in some embodiments, the lowest priority label available is used. The term "dummy message" as used herein refers to a message used for arbitration purposes but which does not otherwise communicate data to be processed by nodes 102-1 . . . 102-N.

Nodes that are actively transmitting and arbitrating will continue to transmit the entire MSG ID since they will be higher priority than the transmitted lowest priority hub 104 MSG ID. Due to the CAN bit stuffing rules, even the lowest priority MSG ID transmitted by hub 104 requires certain dominant bits to be transmitted with the MSG ID field. However, since MSG ID bit stuffing is removed for nodes 102-1 . . . 102-N, if hub 104 detects five identical bits following the SOF it can deduce that either the connected node is idle (that is, receiving and not transmitting, if five recessive bits are detected), or that the connected node is erroneous if five dominant bits are detected.

When an idle node is detected, hub 104 simply continues sending the lowest priority MSG ID allocated to it. Unlike nodes 102-1 . . . 102-N, hub 104 performs the bit stuffing of the MSG ID to maintain the legality of this lowest priority MSG ID as it is transmitted. However, for active arbitrating nodes, hub 104 is guaranteed to detect at least one dominant bit during the first five bits of the MSG ID transmission. In this case, hub 104 behaves as a typical arbitrating node and yields to the higher priority actively transmitting node. Hub 104 then continues to receive the arbitrating messages from each of the arbitrating nodes independently of one another over the corresponding links 106.

The actual arbitration of messages is performed following the reception at hub 104 of the next-to-last bit of each arbitrating node's MSG ID. In particular, hub 104 validates and authenticates each MSG ID as it is received. Validation of a MSG ID includes ensuring that the MSG ID belongs to a set of valid IDs and doesn't violate temporal constraints. Temporal constraints relate to the frequency with which a particular MSG ID may be sent. Thus a valid MSG ID is a MSG ID transmitted from a given node at the correct rate. Authentication of a MSG ID includes ensuring that the MSG ID is received at the correct port. Hub 104 knows which MSG IDs may be received on each port. Thus, hub 104 is able to detect a valid MSG ID that was sent from a masquerading node since the MSG ID was received on an improper port. Hence, hub 104 masks faulty nodes' MSG IDs from affecting the arbitration decision. One exemplary embodiment of logic used in hub 104 to implement the authentication and validation of MSG IDs is described below and shown in FIG. 5.

Figure 5:
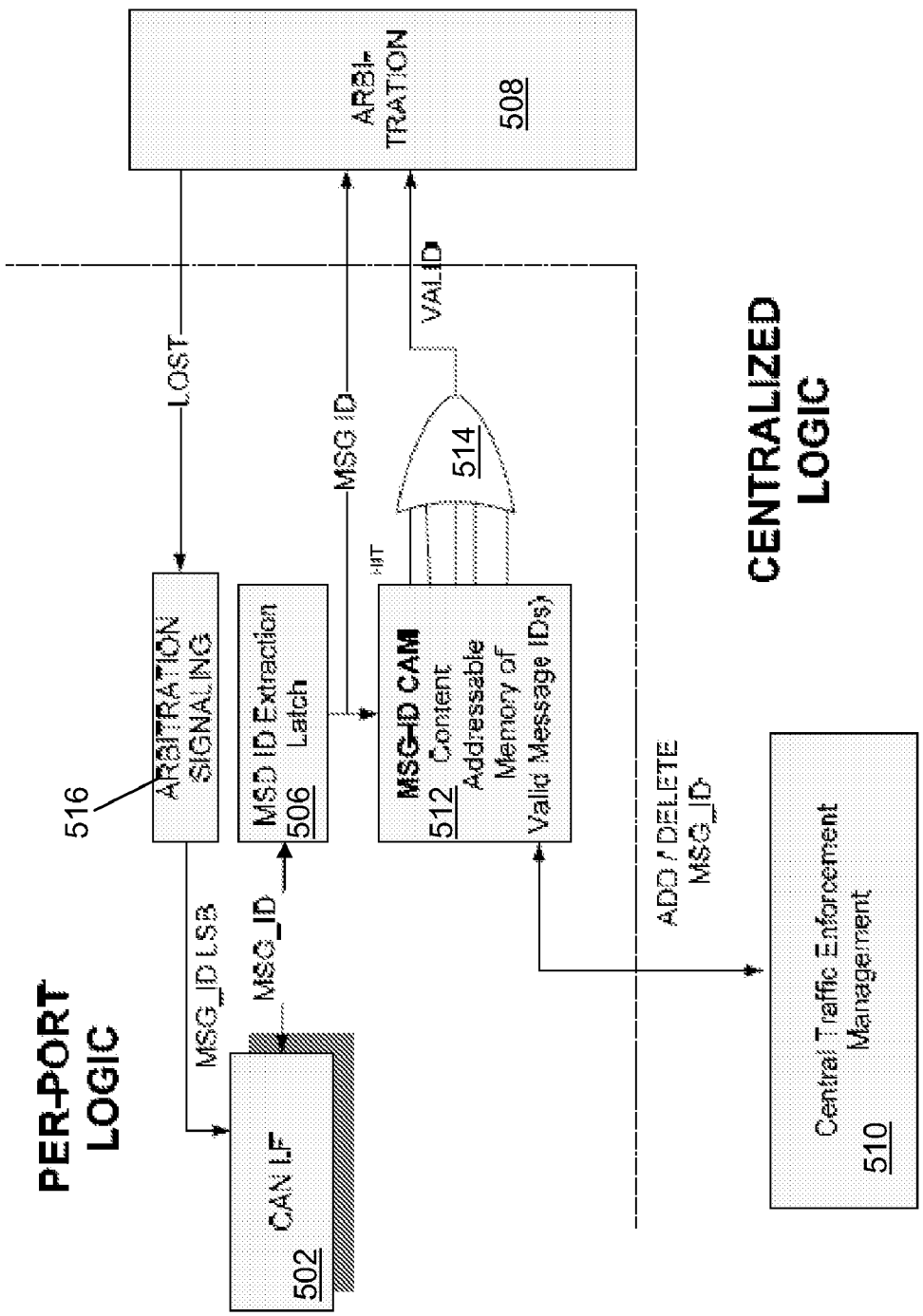
FIG. 5 is a block diagram of one embodiment of a hub.

FIG. 5 is a block diagram depicting logic used in a hub such as hub 104. Per-port logic 501 is replicated in each port of the hub whereas centralized logic 503 is used for all the ports in the hub. Centralized logic 503 includes arbitration logic 508 and traffic enforcement management logic 510. Notably, central arbitration logic 508 can be implemented in various manners including, but not limited to, with field programmable gate arrays (FPGA), application specific integrated circuits (ASIC), or one or more central processing units. In addition, the processing functions of the hub can be implemented using software, firmware, hardware, or any appropriate combination thereof, as known to one of skill in the art.

Per-port logic 501 includes CAN interface 502, MSG ID extraction latch 506, MSG ID content addressable memory (CAM) 512, comparator 514, and arbitration signaling logic 516. CAN interface 502 includes a transmitter and receiver (not shown) coupled to a node such as nodes 102-1 . . . 102-N. MSG ID extraction latch 506 extracts the MSG ID from a message as the message is received. The extracted MSG ID is provided to MSG ID CAM 512 which contains a list of all the valid MSG IDs available for the port. The MSG ID CAM 512 in each port contains a unique list of MSG IDs in this example. The unique list is used to authenticate the MSG ID. In other words, an otherwise valid MSG ID is only authenticated if it is received at the correct port which has the unique list of MSG IDs containing the received MSG ID.

The received MSG ID is also validated by comparing, in comparator 514, the received MSG ID to the list of valid MSG IDs in MSG ID CAM 512. Comparator 514 outputs the result of the comparison to arbitration logic 508 to indicate whether or not the received MSG ID is valid. Thus, MSG ID CAM 512 and comparator 514 mask invalid and/or unauthenticated MSG IDs from affecting arbitration in central arbitration logic 508.

Central arbitration logic 508 receives validated MSG IDs and determines which message to forward based on the priority of each validated MSG ID as described above. Once arbitration logic 508 has selected the message to forward, it signals loss of arbitration to the losing nodes via arbitration signaling logic 516 in each of the ports coupled to the losing nodes. In particular, arbitration signaling logic 516 asserts a dominant bit in the least significant bit of the MSG ID field. The losing nodes then cease transmitting and begin receiving a dummy message from the hub with a dominant LSB as described above.

Traffic enforcement management logic 510 is used to enforce high order system policies, such as transmit rate for each node to prevent a particular node from transmitting too frequently. In particular, once a valid and authenticated MSG ID is received, traffic enforcement management logic 510 deletes the MSG ID from the MSG ID CAM 512 for that port. After a pre-determined time has elapsed, traffic enforcement management logic 510 adds the MSG ID back into MSG ID CAM 512. If the same MSG ID is received during the pre-determined time, the MSG ID will be rejected as invalid. Thus, a node is unable to exceed rate constraints on MSG IDs.

Returning to FIG. 1, hub 104 signals the result of the arbitration decision using the LSB of the MSG ID field. In particular, hub 104 asserts a dominant bit in the LSB on links 106 for all losing nodes. Since, each of nodes 102-1 ... 102-N is configured to transmit a recessive LSB, asserting a dominant LSB signals to the losing nodes that they have lost arbitration. Each of the losing nodes then ceases transmission and switch to receiving a message from hub 104. For the winning node, hub 104 does not assert a dominant bit and simply continues receiving the winning node's message over the corresponding link 106.

In order to transmit the winning node's message with the correct MSG ID, hub 104 has to wait for the dummy message to terminate. In some embodiments, hub 104 simply transmits the dummy message until the end of the frame. However, in other embodiments, hub 104 signals an error to truncate the dummy message transmission. The time at which hub 104 asserts an error is calculated to ensure that, following the end of the error frame, all of nodes 102-1 ... 102-N start arbitration at the same point. Therefore, if hub 104 inserted a stuff bit for an idle node on one of its inputs, the messages being relayed to the active arbitrating nodes will have the message relayed one bit later than for idle nodes to accommodate the time shift of the bit stuffing action.

Once the error frames of all of the losing nodes have completed, hub 104 starts the transmission of the winning message. To ensure that this message wins the following arbitration period, hub 104 elevates the priority of the winning node's MSG ID by asserting a dominant MSB of the MSD-ID field. Hub 104 also recalculates the CRC and performs the bit stuffing algorithm to accommodate this priority elevation change. Each arbitrating node in the following arbitration period, therefore, immediately receives the higher priority message following the end of the inserted error frames. Each of nodes 102-1 ... 102-N are configured to receive the elevated message (that is with a dominant MSB in the message ID field) as if coming from the original winning node. Notably, although in this exemplary embodiment the MSG ID is the priority field, it is to be understood that other priority information can be used in other embodiments. Similarly, although this exemplary embodiment is described in relation to using dominant and recessive bits in the MSB and the LSB for the hub to win arbitration, it is to be understood that other means of modifying the priority information can be used in other embodiments to ensure the hub wins arbitration.

Also, since hub 104 begins forwarding the winning node's message without waiting for the entire winning node's message to be received, the winning node is still transmitting when hub 104 begins forwarding the message to the other nodes. In order to ensure that the winning node does not have a leading start on the next arbitration period, hub 104 inserts overload frames on the winning node's link 106 to hold off the winning node from re-arbitrating until forwarding of the message to the other nodes has completed. The length of the overload delay is calculated to align nodes 102-1 ... 102-N to start the next arbitration sequence simultaneously.

This configuration provides an advantage over typical systems that immediately begin forwarding a message once received at the hub. In such systems, at least a portion of a message has already been forwarded prior to validation and arbitration of messages received at the hub. For example, if a message is determined to be invalid, the forwarded part of the message cannot be retracted as it has already been sent to the other nodes. Such systems, therefore, can increase the error count at the other nodes by potentially allowing portions of invalid messages to be forwarded to all nodes and bus bandwidth is lost during the erroneous message. In embodiments of the present invention, however, hub 104 validates and arbitrates the message IDs prior to forwarding the winning node's message.

Also, as stated above, hub 104 does not have to wait for the entire winner's message to be received prior to forwarding the message. This ability provides an advantage over systems that store the message until the entire message is received and processed. In such systems, once the entire message is received, the hub then forwards the winner's message. These systems introduce increased latency into the transmission of messages from one node to another. In the embodiment shown in FIG. 1, however, latency is reduced by only waiting for the message ID to be received. Once the message ID is received and evaluated, hub 104 is able to begin forwarding the winner's message, once it terminates the dummy message, while it continues to receive the rest of the winner's message. Hence, in embodiments of the present invention, latency is reduced while still enabling fault checks and arbitration prior to forwarding a message.

Hub 104, therefore, is configured to arbitrate messages received from nodes 102-1 ... 102-N. Hub 104 is also a central guardian for nodes 102-1 ... 102-N. By validating and authenticating messages received from nodes 102-1 ... 102-N, hub 104 is able to isolate faulty nodes as well as mitigate network errors, such as babbling idiot and masquerade errors. In addition, hub 104 enables this protection and arbitration while minimizing delay to messages. In particular, hub 104 is only required to delay messages long enough to receive the message ID. Once the message ID is received, hub 104 is able to begin forwarding the selected message prior to receiving the entire message.

In addition, in some embodiments, hub 104 is a self-checking pair in order to detect and prevent failure of hub 104. A self-checking pair provides protection against a faulty hub since each member of the self-checking pair is able to provide guardianship over the other. However, it is to be understood that other configurations can be used in hub 104 in other embodiments. For example, in another embodiment, hub 104 is a dual self-checking pair. A dual self-checking pair provides additional guardianship protection by using two self-checking pairs which guard each other. Alternatively, a single member or a triplex member configuration with three members in hub 104 can be used. With a triplex configuration, each of nodes 102-1 ... 102-N determines if a member of hub 104 is faulty by comparing data received from each of the three members. In other embodiments, other hub configurations can be used which also ensure that hub 104 fails passive.

Furthermore, hub 104 includes or interfaces with hardware components that support the transmission and reception of network communications. By way of example and not by way of limitation, these hardware components include one or more microprocessors, graphics processors, memories, storage devices, interface cards, and other standard components known in the art. Additionally, in some embodiments, hub 104 includes or functions with software programs, firmware or other computer readable instructions for carrying out various methods, process tasks, calculations, and control functions, used in the operation of a network, such as method 400 described above.

These instructions are typically stored on any appropriate computer readable medium used for storage of computer readable instructions or data structures. Such computer readable media can be any available media that can be accessed by a general purpose or special purpose computer or processor, or any programmable logic device. For example, computer readable media can include floppy disks, conventional hard disks, CD-ROM, flash ROM, nonvolatile ROM, RAM, and other like medium.

Any of the foregoing may be supplemented by, or incorporated in, specially-designed application-specific integrated circuits (ASICs). In addition, when information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

Figure 1B:
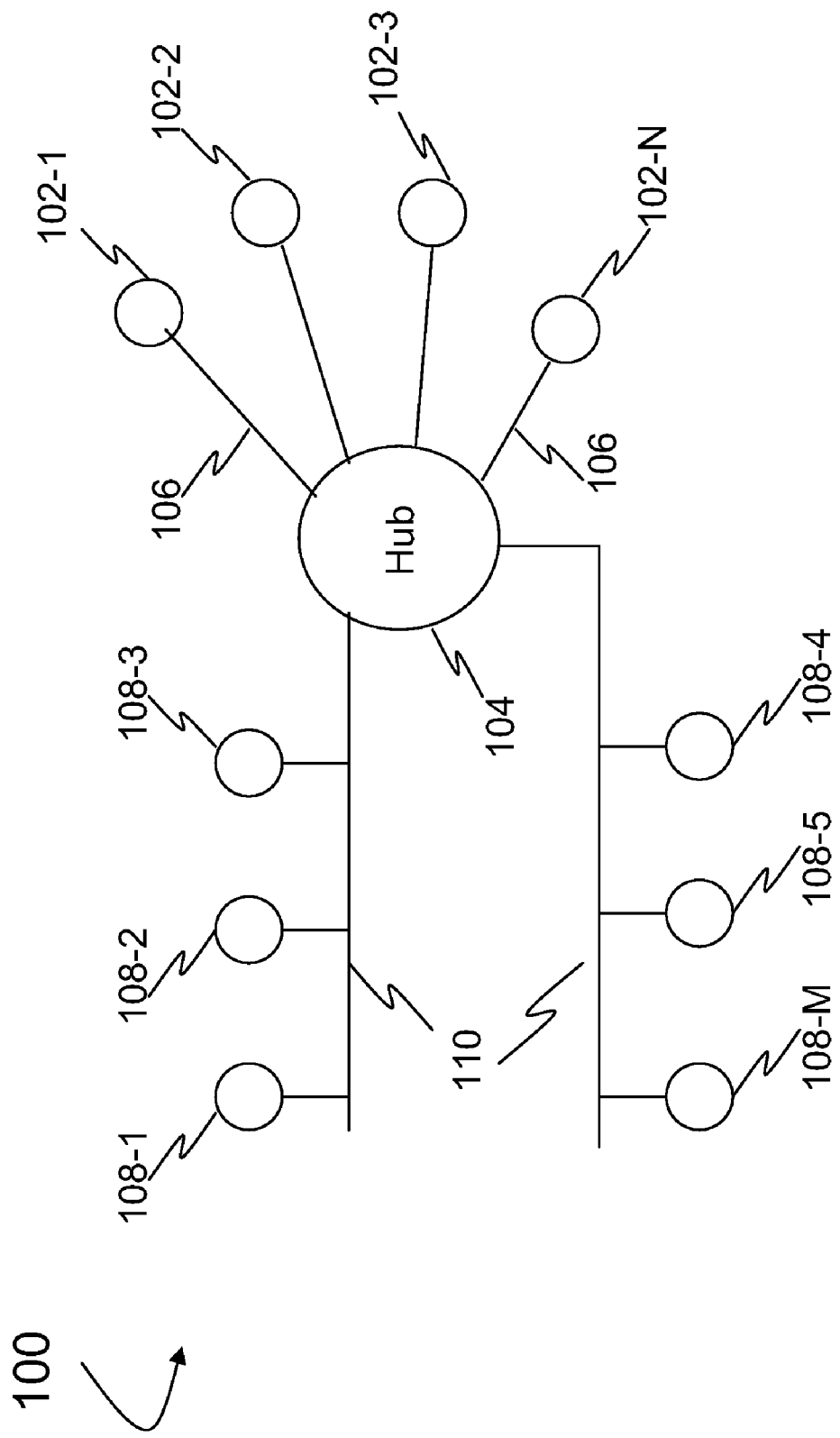
FIG. 1B is a schematic depiction of another embodiment of a network.

FIG. 1B is a schematic depiction of another embodiment of network 100. Network 100 in FIG. 1B includes hub 104, safety-related nodes 102-1 . . . 102-N and non-safety-related nodes 108-1 . . . 108-M. Safety-related nodes 102-1 . . . 102-N are communicatively coupled to hub 104 via independent links 106. Hub 104 arbitrates and validates messages from safety-related nodes 102-1 . . . 102-N as described above. However, non-safety-related nodes 108-1 . . . 108-M are communicatively coupled to hub 104 via one or more simple shared bus segments 110 as in a typical CAN network. Accordingly, message arbitration between non-safety-related nodes 108-1 . . . 108-M is accomplished as in a typical CAN network. Hence, network 100, as illustrated in FIG. 1B, permits the mapping and intermixing of simple bus segments that do not have safety concerns with safety related nodes in the same network 100. Additionally, in some embodiments, at least one of links 106 which individually couple nodes 102-1 . . . 102-N to hub 104 is an optical link.

FIGS. 2 and 3 depict exemplary data message frames. In particular, frames 202 and 302 are configured to be used with the CAN protocol. Frame 202 has an 11-bit message ID comprised of base identifier 206 and frame 302 has a 29 bit message ID comprised of base identifier 306 and extended identifier 308. Also, the least significant bit in the message ID in frame 202 is the last bit 212 of base identifier 206 whereas the least significant bit in the message ID in frame 302 is the last bit 312 of extended identifier 308. The structure and use of frames 202 and 302 are known to one of skill in the art and, therefore, not described in more detail herein.

FIG. 4A is a flow chart depicting one embodiment of a method 400 of communicating in a network. Method 400 is implemented in a hub in a network such as hub 104 in network 100. At 404, a hub (e.g. hub 104) waits for a start of frame (SOF) bit to be received. Once an SOF frame bit is received at the hub on any port, the hub transmits a dummy message to each of a plurality of nodes (e.g. nodes 102-1 . . . 102-N) while receiving a message from at least one of the plurality of nodes during an arbitration period at 406. Each of the plurality of nodes is coupled to the hub via a point-to-point communication link such as links 106 in FIG. 1. For example, in one embodiment, upon detecting a start of frame (SOF) bit from at least one of the plurality of nodes, the hub reflects the SOF bit to each of the plurality of nodes. Reflection of the SOF bit aligns each of the plurality of nodes for an arbitration period. During the arbitration period, each of the plurality of nodes which desires to transmit begins sending its message priority field to the hub. The message priority field in this embodiment is the MSG ID.

In order to maintain the standard CAN operation for each of the plurality of nodes, the hub sends a priority field of the dummy message on each of the plurality of links. The dummy message is assigned a sufficiently low priority such that each message being transmitted from the at least one node has a higher priority. Thus, each node will believe it is winning arbitration and continue transmitting its respective message to the hub. In one embodiment, the dummy message is assigned the lowest available priority. At 408, the hub analyzes the priority field from each node as it is received to validate and/or authenticate the messages. In particular, the hub completes the validation and/or authentication by the next to last bit of the priority field in this embodiment. In other embodiments, the hub performs the validation and/or authentication after receiving the entire priority field.

The hub selects which message to forward from the validated and/or authenticated messages at 410. The selection is based, at least in part, on the priority of each message. If an invalid MSG ID is received, the hub blocks that message. The hub then selects the highest priority message of the messages which have not been blocked. In addition, in some embodiment, the selection is based on other system policies in addition to the priority of the message. In this way, the hub acts as a guardian for the nodes coupled to the hub. The hub can physically isolate faulty nodes and mitigate errors such as babbling idiot and masquerade errors.

At 412, the hub signals to the losing nodes that they have lost arbitration. In particular, the hub modifies the priority level of the dummy message such that the dummy message wins arbitration over the message from each of the losing nodes. For example, in one embodiment, the hub modifies the priority level of the dummy message by asserting a dominant bit in the last bit of the dummy message priority field (i.e. LSB) that is transmitted to the nodes that lost arbitration. The priority level transmitted to each of the losing nodes is reserved for use by the hub in signaling arbitration loss. Upon seeing the dominant bit in the LSB of the priority field of the dummy message from the hub, each of the losing nodes ceases transmission of its respective message. Notably, in some embodiments where both 11-bit message IDs and 29-bit message IDs are used, when the hub determines that an 11-bit node has won the arbitration, the hub signals such a result to 29-bit nodes by setting a dominant IDE bit (e.g. IDE bit 310 in FIG. 3) instead of waiting to use the LSB of the 29-bit message ID. In such embodiments, the IDE bit is also a reserved bit.

At 414, the hub finishes the dummy message in order to begin forwarding the winning node's message. In this embodiment, the hub does not wait for the entire dummy message to be sent but rather signals an error during the dummy message by sending a series of common bits which cause an error (e.g. six consecutive logical "1s" or six consecutive logical "0s"). The forced error clears the dummy message and enables the hub to begin forwarding the winner's message to the nodes that lost arbitration. In addition, the plurality of nodes is configured to reject messages with a dominant LSB. Therefore, the error count for the nodes is minimally affected in this embodiment which uses the CAN protocol. That is, the losing nodes see the error but since the message ID is not associated with any of the nodes, the error count is only incremented by 1. Once the correct message is received following the dummy message, the error count is decremented by 1. Therefore, the dummy message has minimal impact on the error count for nodes in embodiments using the CAN protocol. In other embodiments, the hub does not force an error and sends an empty dummy message.

After the dummy message has been sent or is otherwise cleared, the hub begins forwarding the selected winner's message to the losing nodes at 416. In order to ensure that the winner's message wins arbitration on each link, the hub elevates the winner's priority field to ensure that the winner's message wins the next arbitration action. In particular, in this embodiment, the hub modifies the winner's priority field (message ID in this example) to have a dominant MSB. The nodes are configured to accept the modified message ID as if originating from the winning node. In addition, bit stuffing and cyclic redundancy checksums (CRCs) are recalculated for the modified message ID with the dominant MSB. By having a dominant MSB, the hub is guaranteed to win arbitration on each link since all the nodes are each configured to transmit a recessive MSB.

In addition, the hub allows the node which is transmitting the selected message to win arbitration by not modifying the priority level of the dummy message sent to the winning node. That is, in this embodiment, the hub does not send a dominant LSB to the winning node so that the winning node continues to transmit its message. Thus, at 422, the hub continues to received the winner's message. At 424, the hub determines if the winner's message has been completely received. If not, the hub continues to receive the winner's message until it has completed. Following the completion of the winning node's transmission to the hub, the hub signals acknowledgement of the message to the winning node at 426. For example, in this embodiment, the hub asserts a dominant bit in the ACK field of the acknowledgment field (e.g. ACK field 216 in FIG. 2 and ACK field 316 in FIG. 3).

At 428, while the hub is forwarding the winner's message to the losing nodes, the hub simultaneously signals the winning node with an overload frame. The overload frame holds the winning node passive until the relayed transmissions of the winner's message to the losing nodes are complete. In particular, the line coupled to the winning node is held LOW for a delayed period. The length of the delayed period is calculated to align the winning node with the other nodes such that all the connected nodes start the next arbitration sequence simultaneously. At 430, the hub determines if the losing nodes have received the complete winner's message. If not, the hub continues to signal the winning node with the overload frame at 428. Once the losing nodes have received the complete winner's message, the hub releases the winning node, at 432, to arbitrate in the next arbitration period. Method 400 then ends at 436.

Figure 4B:
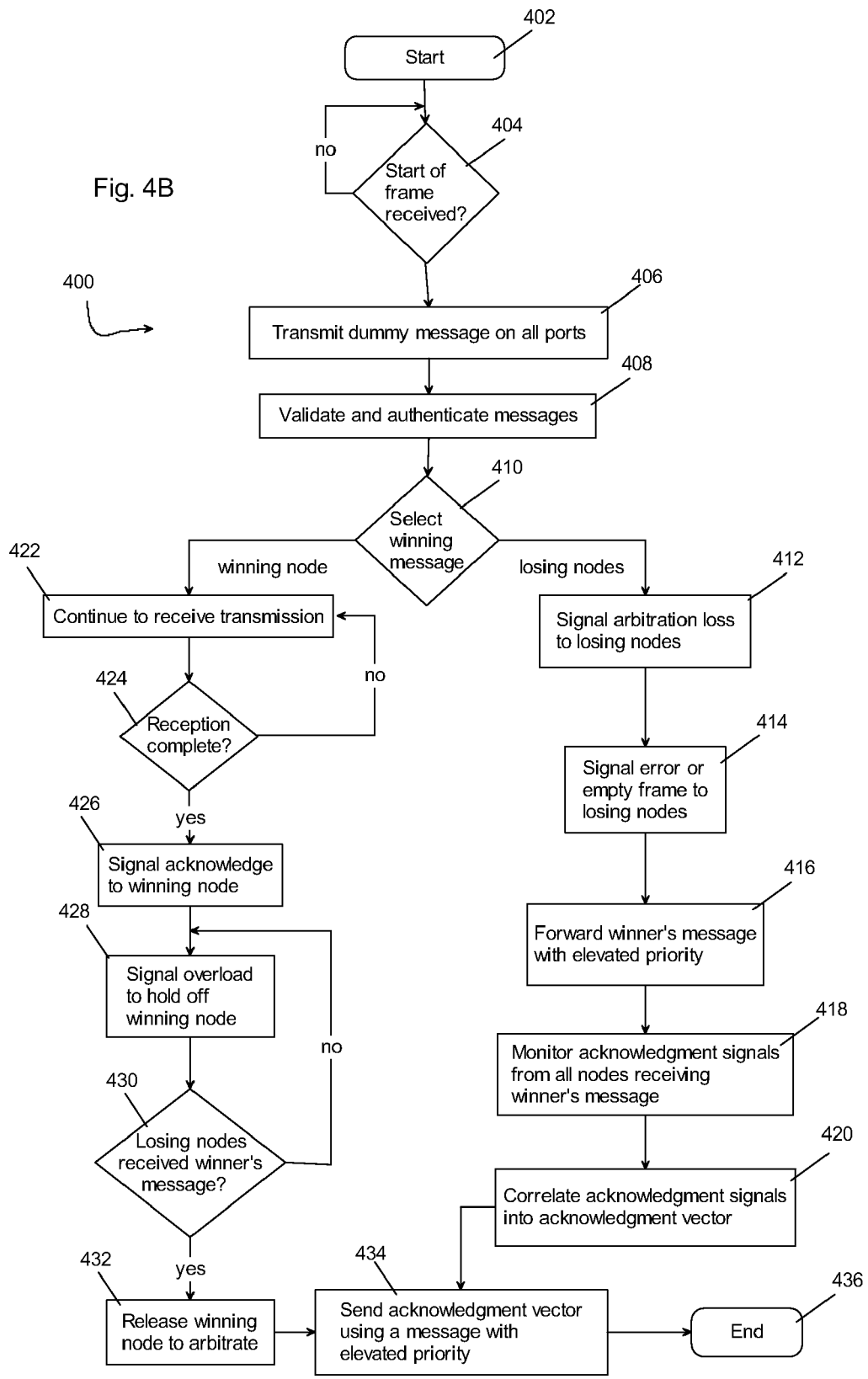
FIG. 4 is a flow chart depicting one embodiment of a method of communicating in a network.

FIG. 4B is a block diagram of another embodiment of the method 400 of communicating in a network. The exemplary method shown in FIG. 4B is similar to the exemplary method of FIG. 4A. However, the method shown in FIG. 4B includes optional blocks for acknowledging receipt of the winner's message by the losing nodes. In particular, at 418, the hub monitors acknowledgment signals from the losing nodes that successfully received the forwarded winner's message. The losing nodes acknowledge receipt of the winner's message by asserting a dominant bit in the ACK field of the acknowledgment field in this embodiment. Since the hub is coupled to only one of the nodes on each link (as shown in FIG. 1), the hub knows which nodes have acknowledged correct receipt of the winner's message. In contrast, a hub in systems using a bus does not know exactly which nodes have asserted the dominant bit in the ACK field.

At 420, the hub correlates the acknowledgment bits into an acknowledgment vector to identify which nodes successfully received the winner's message. At 434, the hub transmits the acknowledgment vector in a message with elevated priority to at least the winning node. In particular, in some embodiments, the hub transmits the acknowledgment vector in a message to all of the nodes. Also, in this embodiment, the hub transmits the acknowledgment vector immediately after the inter-frame gap which follows the winner's forwarded message. In this embodiment, the hub uses the highest allowed priority to guarantee winning arbitration on each link. In this way, each node that receives the acknowledgment vector knows the status of the other nodes immediately after receiving the winner's message.

Notably, although the hub is configured to transmit the acknowledgment vector frame immediately following the winner's forwarded message in this example, other embodiments can be implemented in other ways. For example, in other embodiments, the hub transmits the acknowledgment vector frame at a later point in time rather than immediately following the forwarded message. In such embodiments, the acknowledgement vector frame includes information that associates that acknowledgement vector frame with the corresponding winner's forwarded message. Further details regarding the acknowledgment vector are discussed in the co-pending U.S. patent application Ser. No. 11/557,886, the '525 application. Method 400 then ends at 436.

Although specific embodiments have been illustrated and described herein, it will be appreciated by those of ordinary skill in the art that any arrangement, which is calculated to achieve the same purpose, may be substituted for the specific embodiment shown. For example, in other embodiments, more than one LSB is reserved for identifying loss of arbitration to account for bit stuffing. Additionally, although embodiments of the present invention have been discussed with respect to a pipelined forwarding of messages on a bit-by-bit basis, other embodiments implement a store-and-forward hub. A store-and-forward hub waits to receive at least the entire priority field prior to forwarding any bits. In such embodiments, the LSB of the priority field does not have to be reserved to indicate loss of arbitration. This application is intended to cover any adaptations or variations of the present invention. Therefore, it is manifestly intended that this invention be limited only by the claims and the equivalents thereof.

What is claimed is:

1. A network comprising:
   a plurality of nodes;
   a plurality of bi-directional point-to-point communication links, wherein a priority-based arbitration scheme is used to communicate over each of the plurality of point-to-point links; and
   a hub that is communicatively coupled to each of the plurality of nodes via the plurality of point-to-point links; wherein when the hub determines that one or more of the nodes is transmitting a message via the hub, the hub selects which node's message should be forwarded to the other nodes based, at least in part, on the priority-based arbitration scheme, elevates the priority of the selected node's message and forwards the selected node's message to the other nodes with elevated priority.

2. The network of claim 1, wherein each of the other nodes acknowledges to the hub the successful receipt of a predetermined portion of the forwarded message by signaling one or more dominant bits on each of the other nodes' respective point-to-point link within an acknowledgment field included within the forwarded message;
   wherein the hub assembles an acknowledgment vector message that indicates which nodes have acknowledged receipt of the forwarded message and transmits the acknowledgment vector message to at least the selected node by assigning an appropriate priority to the acknowledgment vector message so that the hub wins bus arbitration on each respective point-to-point link at the desired time.

3. The network of claim 1, wherein each message transmitted by each of the plurality of nodes includes priority information indicating the priority of each message, wherein at least one priority level is reserved for use by the hub in elevating the message priority of the selected nodes' message such that elevated message priority is higher than the priority of each message transmitted by each of the plurality of nodes.

4. The network of claim 3, wherein the priority information is the message ID.

5. The network of claim 4, wherein the priority information is represented in one or more bit fields used in a bit-for-bit arbitration scheme.

6. The network of claim 5, wherein the hub elevates the priority of the selected node's message by modifying the priority information to have a dominant most significant bit.

7. The network of claim 1, wherein the hub transmits a dummy message over each of the plurality of links whenever the hub begins to receive a message from at least one of the plurality of nodes, wherein the dummy message is transmitted with a priority level such that the dummy message has a lower priority than each message transmitted over one of the plurality of links at the same time as the dummy message.

8. The network of claim 7, wherein the hub signals arbitration loss to the other nodes by modifying the priority of the dummy message transmitted to the other nodes such that the dummy message wins arbitration over each message transmitted by the other nodes at the same time as the dummy message.

9. The network of claim 8, wherein the priority level of the dummy message transmitted to the other nodes is a level reserved for use by the hub to indicate arbitration loss.

10. The network of claim 8, wherein the priority level of the dummy message is represented in one or more bit fields and the hub modifies the priority level of the dummy message transmitted to the other nodes by setting a dominant bit in the least significant bit of the one or more bit fields.

11. The network of claim 1, wherein the hub is configured to perform at least one of validation and authentication of the messages as they are received.

12. The network of claim 1, wherein the hub is comprised of a self-checking pair, a dual self-checking pair, a single member, or a triplex member hub.

13. The network of claim 1, wherein the priority-based arbitration scheme is a Controller Area Network (CAN) arbitration scheme, wherein at least one of the plurality of bi-directional point-to-point communication links is an optical link.

14. The network of claim 1, further comprising:
at least one shared medium; and
a plurality of second nodes; wherein the plurality of second nodes is coupled to the hub via the at least one shared medium.

15. A hub, comprising:
a plurality of ports to communicatively couple the hub to a plurality of bi-directional point-to-point links;
wherein the hub receives messages over the plurality of ports and selects which message to forward based at least in part, on a priority-based arbitration scheme, elevates the priority of the selected message and forwards the selected message with an elevated priority.

16. The hub of claim 15, wherein the hub is configured to elevate the priority of the selected message by modifying a priority field of the selected message to have a higher priority than other messages on the plurality of bi-directional links.

17. The hub of claim 16, wherein the hub is configured to elevate the priority of the selected message by modifying the priority field of the selected message to have a dominant most significant bit.

18. The hub of claim 15, wherein the hub transmits a dummy message over the plurality of bi-directional point-to-point links via the plurality of ports while receiving messages during an arbitration period, wherein the dummy message is transmitted with a priority level such that the dummy message has a lower priority than each message transmitted over one of the plurality of links at the same time as the dummy message.

19. The hub of claim 18, wherein the hub is configured to signal which messages lost arbitration by modifying the priority level of the dummy message such that the dummy message wins arbitration over the messages which were not selected.

20. The hub of claim 19, wherein the hub is configured to signal which messages lost arbitration by modifying the priority level with a dominant least significant bit in the dummy message's priority field.

21. A method comprising:
transmitting a dummy message to each of a plurality of nodes while receiving a message from at least one of the plurality of nodes during an arbitration period, wherein the priority level of the dummy message is lower than the priority of each message transmitted from the plurality of nodes during the arbitration period;
selecting which node's message to forward from the hub;
signaling which nodes lost arbitration by modifying the priority level of the dummy message such that the dummy message wins arbitration over the message from each of the losing nodes; and
forwarding the selected message to each of the losing nodes with elevated priority.

22. The method of claim 21, wherein signaling which nodes lost arbitration by modifying the priority level of the dummy message comprises modifying the priority level of the dummy message by asserting a dominant least significant bit (LSB) in the priority field of the dummy message sent to each losing node.

23. The method of claim 21, wherein forwarding the selected message with elevated priority includes modifying the selected message's priority field to have a dominant most significant bit (MSB).

24. The method of claim 21, further comprising:
collecting, at the hub, an acknowledgment bit from each of the losing nodes which successfully received the forwarded message into an acknowledgment vector; and
transmitting the acknowledgment vector in a message from the hub to at least the winning node by assigning an appropriate priority to the acknowledgment vector message so that the hub wins bus arbitration.

25. The method of claim 21, further comprising:
validating and authenticating each message received from the plurality of nodes;
wherein the hub selects which message to forward from the validated and authenticated messages.

* * * * *